(12) United States Patent
Zetterstroem

(10) Patent No.: US 7,537,223 B2
(45) Date of Patent: May 26, 2009

(54) VEHICLE WHEEL SUSPENSION ASSEMBLY

(75) Inventor: Sigvard Olof Zetterstroem, Vaestra Froelunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 11/275,115

(22) Filed: Dec. 12, 2005

(65) Prior Publication Data

US 2007/0131474 A1 Jun. 14, 2007

(51) Int. Cl.
*B60G 7/02* (2006.01)
(52) U.S. Cl. ................. 280/86.75; 280/5.52; 280/5.522; 280/86.751; 280/86.758
(58) Field of Classification Search ................. 280/5.52, 280/5.522, 5.521, 5.524, 86.75, 86.751, 86.758, 280/99
See application file for complete search history.

(56) References Cited

U.S. PATENT DOCUMENTS

| | | | | |
|---|---|---|---|---|
| 4,519,627 | A | * | 5/1985 | Shibahata et al. ........ 280/5.524 |
| 4,539,497 | A | | 9/1985 | Boyer |
| 4,546,997 | A | * | 10/1985 | Smyers .................... 280/5.509 |
| 4,726,603 | A | | 2/1988 | Sugiyama et al. |
| 5,087,229 | A | | 2/1992 | Hewko et al. |
| 5,150,763 | A | | 9/1992 | Yamashita et al. |
| 5,156,414 | A | | 10/1992 | Fayard et al. |
| 5,415,426 | A | | 5/1995 | Strasser |
| 5,428,532 | A | | 6/1995 | Yasuno |
| 5,498,018 | A | * | 3/1996 | Wahl et al. ............ 280/124.146 |
| 5,557,525 | A | | 9/1996 | Miichi et al. |
| 5,700,025 | A | | 12/1997 | Lee |
| 6,267,387 | B1 | * | 7/2001 | Weiss ........................ 280/5.52 |
| 6,293,561 | B1 | | 9/2001 | Goetzen et al. |
| 6,347,802 | B1 | * | 2/2002 | Mackle et al. ........... 280/5.521 |
| 6,386,553 | B2 | | 5/2002 | Zeterstroem |
| 6,634,654 | B2 | | 10/2003 | Maeckle et al. |
| 6,793,228 | B2 | * | 9/2004 | Zadok ................. 280/124.134 |
| 6,874,793 | B2 | | 4/2005 | Choudhery |
| 2003/0111812 | A1 | | 6/2003 | Carlstedt et al. |

FOREIGN PATENT DOCUMENTS

| | | |
|---|---|---|
| DE | 43203024 A1 | 1/1994 |
| EP | 0536191 B1 | 4/1993 |
| EP | 0340823 B1 | 9/1993 |
| EP | 1053165 B1 | 11/2000 |
| EP | 1354731 A1 | 4/2002 |
| JP | S62125907 A | 6/1987 |
| JP | H0533846 A | 12/1993 |
| JP | H06286447 A | 10/1994 |

OTHER PUBLICATIONS

European Search Report for corresponding European Application No. 06125268.0-1264, dated Mar. 19, 2007, 8 pages.

* cited by examiner

*Primary Examiner*—Toan C To
(74) *Attorney, Agent, or Firm*—Brooks Kushman P.C.

(57) ABSTRACT

A suspension assembly for a vehicle wheel is provided with a hub assembly for supporting a wheel for rotation. A first control arm is pivotally connected to the hub assembly and a chassis of the vehicle. An actuator is connected to the chassis and the hub assembly for translating the hub assembly relative to the chassis. A linkage is connected to the chassis and the hub assembly proximate to the actuator for reducing transverse loads and torques applied to the actuator.

20 Claims, 5 Drawing Sheets

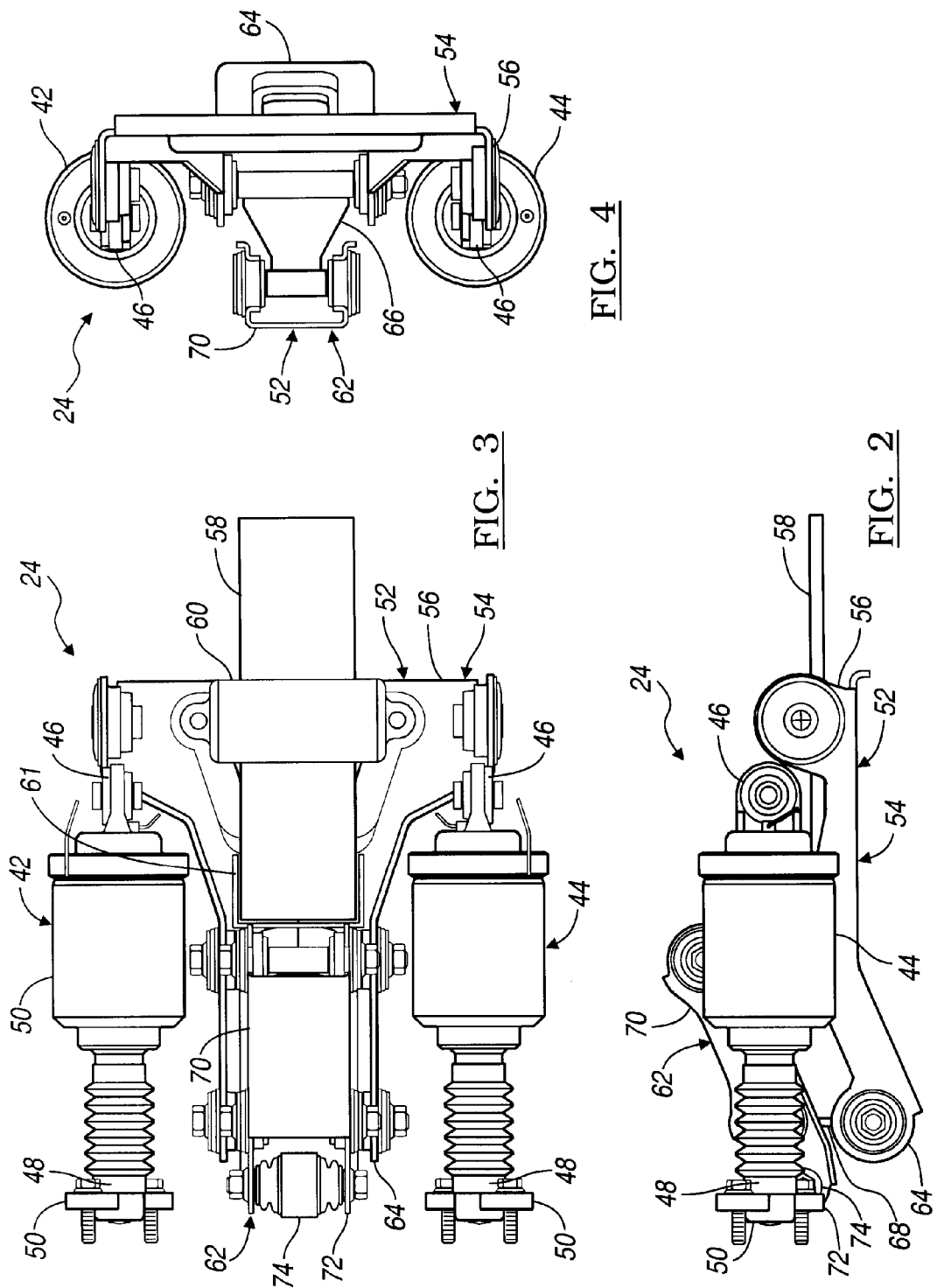

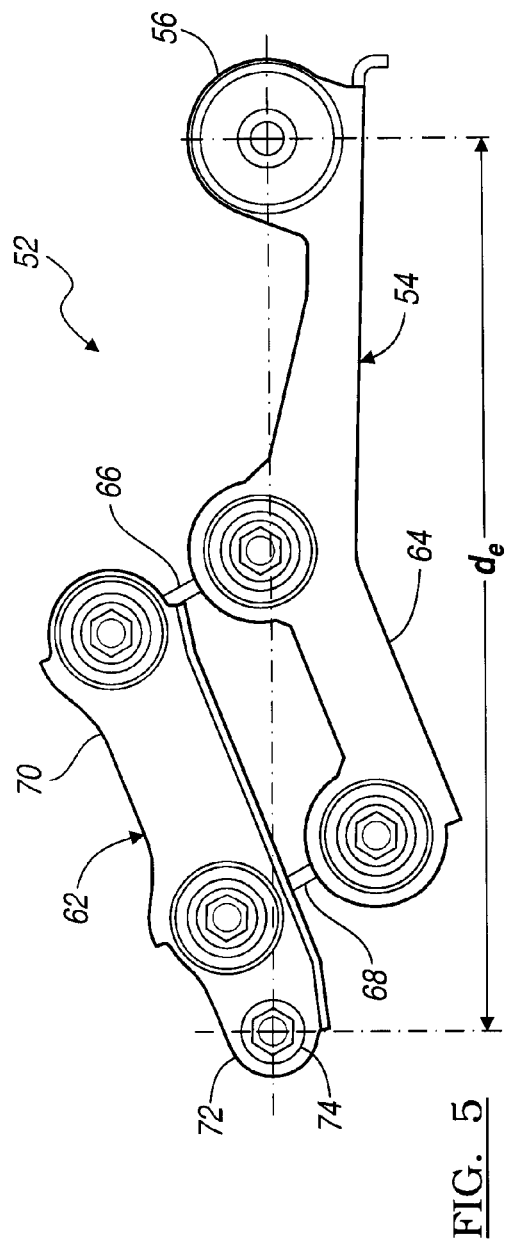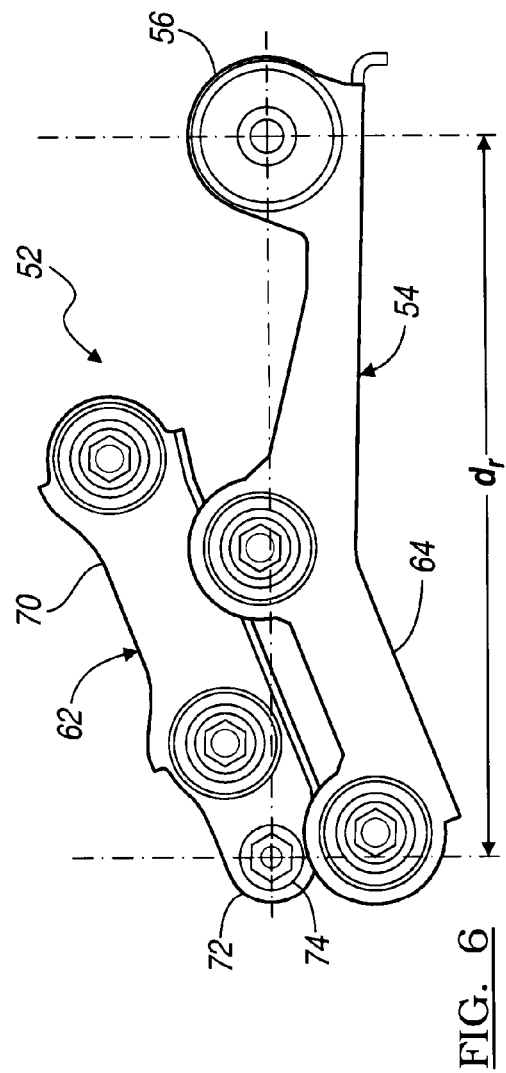

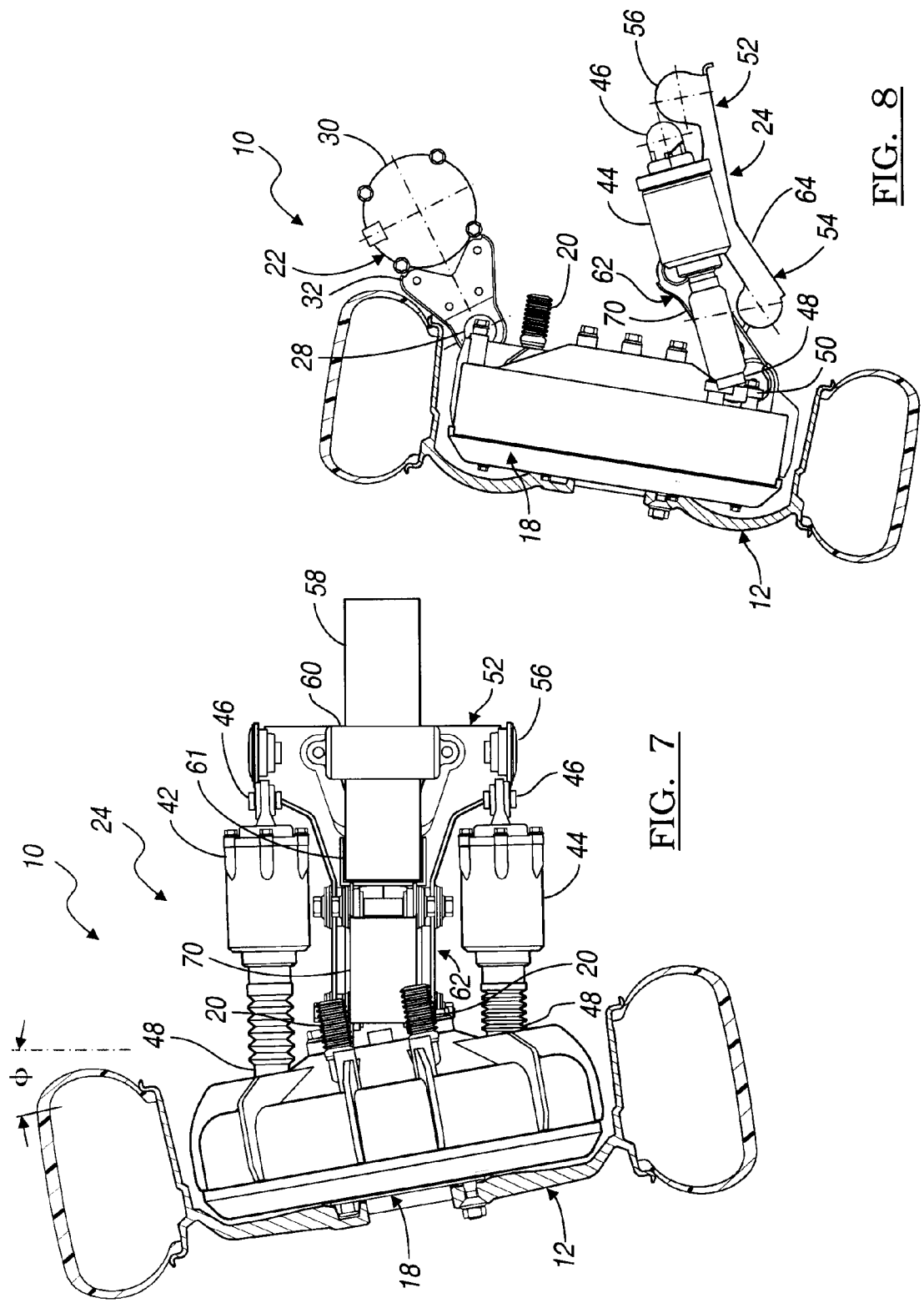

VEHICLE WHEEL SUSPENSION ASSEMBLY

BACKGROUND OF THE INVENTION

1. Field of the Invention

The present invention relates to vehicle suspensions, more particularly to vehicle suspensions having actuators.

2. Background Art

Suspension systems in vehicles have been provided to isolate a chassis of the vehicle from shock and vibrations imparted to wheels from an underlying road surface as the vehicle travels. Additionally, suspensions provide stability to the vehicle due to the handling of the suspension. Further, suspension systems provide particular controls of the vehicle, such as steering. Suspension assemblies have been provided that permit adjustment of the wheels, such as camber, caster, alignment and the like.

Suspension assemblies often times must accommodate a drive train of the vehicle. Such drive trains may be driven by a gasoline engine, a diesel engine, an electric motor, a hybrid motor, or the like. The drivetrains of these vehicles may include rear wheel drive, front wheel drive, four wheel drive, all wheel drive, or the like.

Conventional suspensions and control systems in passenger cars are designed as, and consisting of, separate systems. However, these separate suspension and steering systems act in close cooperation to collectively fulfill various demands, additional to basic functions of directional control, support of the vehicle, stability and comfort. Refining and tuning of these systems often requires complicated modifications which are time consuming and costly.

Accordingly, advancements in vehicle technology have led to integration of suspension and steering/alignment functions of the road wheel in a given system. An example of such a system is disclosed in U.S. Pat. No. 6,386,553 B2, which issued on May 14, 2002 to Sigvard Zetterström. Another example of such a suspension assembly is disclosed in European Patent Application No. 1 354 731 A1, which published on Oct. 22, 2003 to Sigvard Zetterström.

These integrated suspension assemblies incorporate actuators for performing control features, such as steering. These integrated assemblies also provide alignment capabilities for enhancing stability and/or comfort and minimizing maintenance or retuning. These integrated systems also incorporate variable shock absorption features for providing an ideal suspension configuration for a given set of vehicular conditions.

SUMMARY OF THE INVENTION

A non-limiting embodiment of the present invention provides a suspension assembly for a vehicle wheel with a hub assembly that supports a wheel for rotation. A control arm is pivotally connected to the hub assembly and pivotally connected to a chassis of a vehicle. An actuator is connected to the chassis and the hub assembly for translating the hub assembly. A linkage is connected to the chassis and the hub assembly proximate to the actuator for reducing transverse loads and torques applied to the actuator.

Another non-limiting embodiment of the invention provides a motor vehicle suspension having at least four independent wheel suspension assemblies. Each independent wheel suspension assembly includes a hub assembly which supports a wheel for rotation. A control arm is pivotally connected to the hub assembly and a chassis of the vehicle. An actuator is connected to the chassis and the hub assembly for translation of the hub assembly. A linkage is connected to the chassis and the hub assembly proximate to the actuator for reducing transverse loads and torques applied to the actuator.

Another non-limiting embodiment of the invention provides an independent suspension assembly for a vehicle wheel having a hub assembly supporting a wheel for rotation relative to the hub assembly. An upper control arm is pivotally connected to a chassis of the vehicle, and the upper control arm is pivotally connected to the hub assembly via a ball joint. The upper control arm includes a spring and a damper for absorbing and damping vibrations from the hub assembly. A lower control arm includes a pair of spaced apart linear actuators pivotally connected to the chassis and pivotally connected to the hub assembly for controlling steering, camber and alignment of the wheel. A pivot link is pivotally connected to the chassis and extends between the pair of linear actuators. A four bar mechanism is attached to the pivot link and is pivotally connected to the hub assembly. The four bar mechanism extends and retracts relative to the chassis as the hub assembly is translated by the pair of linear actuators. The four bar mechanism distributes vertical forces and torques from the hub assembly to the chassis for minimizing vertical forces and torques that are applied to the pair of linear actuators.

The above aspects, objects, embodiments, benefits and advantages are apparent in the attached figures and in the detailed description of embodiments of the invention below.

BRIEF DESCRIPTION OF THE DRAWINGS

FIG. 2 is a rear side elevation view of a control arm of the suspension assembly of FIG. 1;

FIG. 3 is a top plan view of the control arm of FIG. 2;

FIG. 4 is a side elevation view of the control arm of FIG. 2 facing laterally outboard of the vehicle;

FIG. 5 is an enlarged rear side elevation view of a linkage of the control arm of FIG. 2, illustrated in an extended position;

FIG. 6 is a rear side elevation view of the linkage of FIG. 5, illustrated in a retracted orientation;

FIG. 7 is a top plan partial section of the vehicle wheel and the lower control arm of FIG. 1, illustrated in an orientation during a steering operation thereof;

FIG. 8 is a rear side elevation partial section view of the suspension assembly and vehicle wheel of FIG. 1, illustrated in a rebound orientation;

DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The Figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
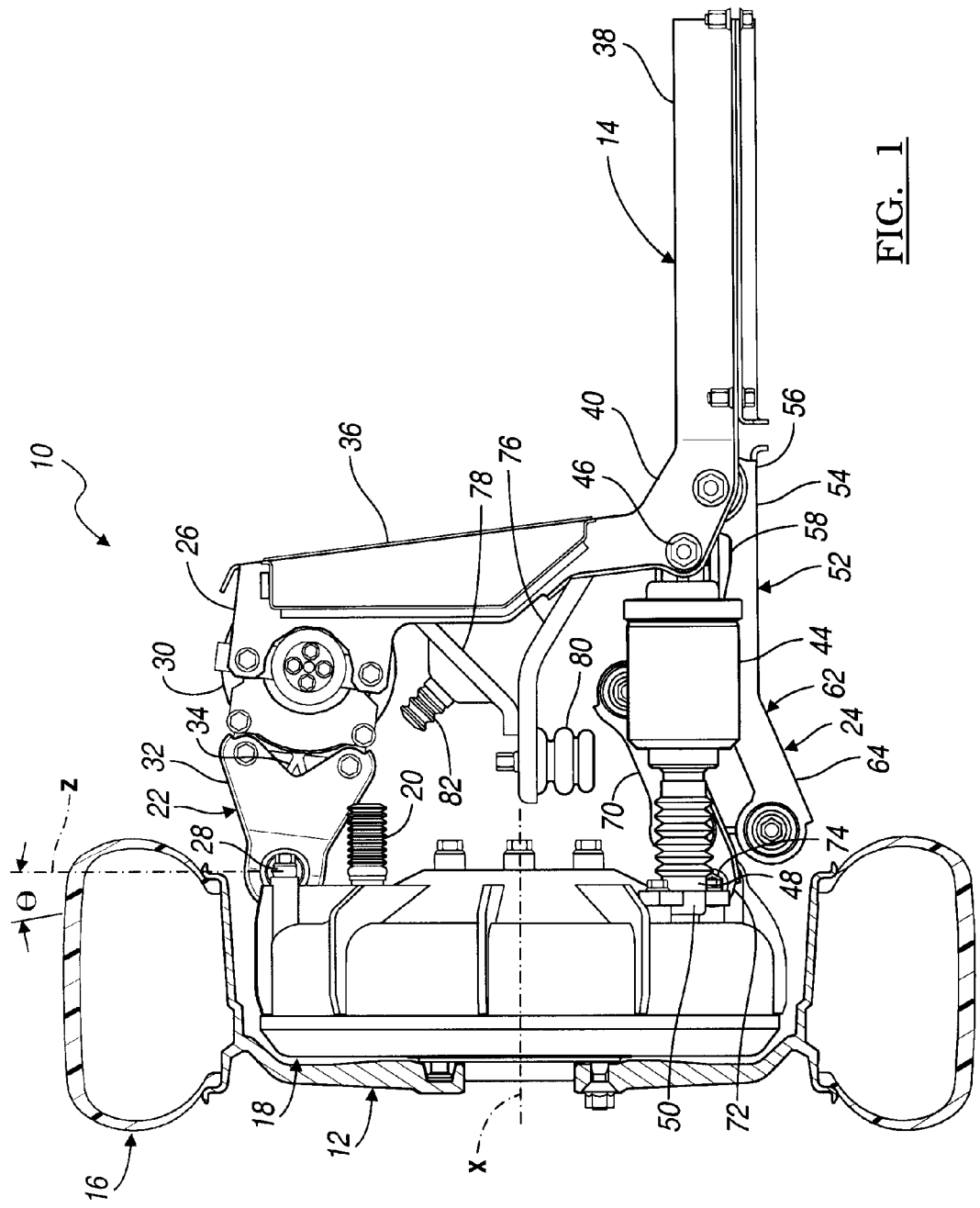
FIG. 1 is a rear side elevation partial section view of a suspension assembly for a vehicle wheel in accordance with the present invention, illustrated in cooperation with a vehicle chassis and a vehicle wheel.

With reference now to FIG. 1, a suspension assembly is illustrated in accordance with the present invention and is referenced generally by numeral 10. The suspension assembly 10 is illustrated from a rear view of an associated vehicle. The suspension assembly 10 affixes a wheel 12 to a chassis 14 of the vehicle. The wheel 12 includes a tire 16 that engages an underlying road surface. A portion of a weight of the vehicle is distributed through the chassis 14 to the wheel 12 through the suspension assembly 10. Accordingly, the suspension assembly 10 is utilized in combination with other suspension assemblies to collectively distribute the weight of the vehicle through the chassis 14 to the wheels 12 through the various suspension assemblies.

The invention contemplates that the suspension assembly 10, illustrated in FIG. 1, may be utilized for each wheel 12 of a given vehicle. For example, the suspension assembly 10 may be employed for four wheels 12 of the vehicle. Alternatively, the suspension assembly 10 may be utilized for two wheels 12 of the vehicle, and another suspension assembly may be utilized for the other wheels of the vehicle. The invention contemplates that the suspension assembly 10 may be an independent suspension assembly as illustrated in FIG. 1, or it may be integrated with the suspension assembly of another wheel 12 of the vehicle.

The suspension assembly 10 is mounted to a hub assembly 18. The wheel 12 is fastened to the hub assembly 18 for rotation of the wheel 12 relative to the hub assembly 18. Accordingly, the hub assembly 18 includes a bearing assembly (not shown) for rotatively supporting the wheel 12.

The hub assembly 18, illustrated in FIG. 1, may include a geared hub motor (not shown) and a geared friction drum brake (not shown). Such hub assemblies are known in the art such as that disclosed in U.S. Pat. No. 6,386,553 B2, which issued to Zetterström on May 14, 2002. The Zetterström U.S. Pat. No. 6,386,553 B2 patent is incorporated in its entirety by reference herein.

Accordingly, the hub assembly 18 may include a motor for driving the wheel 12 and a brake assembly for decelerating the rotation of the wheel 12. Of course, the invention contemplates that the suspension assembly 10 may be utilized with any hub assembly, regardless of drive source or brake assembly. For example, the hub assembly 18 may be utilized with no source of rotational drive, or with mechanical rotational drive sources such as a half shaft in a front wheel, all wheel or four wheel drive application, or a driving axle shaft in a conventional rear wheel drive application. Of course, the invention contemplates utilization of the suspension assembly 10 with any braking system in the hub assembly 18 including also disk brakes, hydraulically actuated brakes, or the like.

By utilizing the hub assembly 18 of the Zetterström U.S. Pat. No. 6,386,553 B2 patent, the driving and braking of the wheel 12 may be controlled electronically and/or via software.

The hub assembly 18 is illustrated with a pair of flexible tubes 20 for intake and outlet of a fluid for cooling the motor and brake assembly within the hub assembly 18.

The suspension assembly 10 includes an upper control arm 22 and a lower control arm 24. The upper control arm 22 is pivotally connected to a support 26 of the chassis 14. The upper control arm 22 is pivotally connected to the support 26 for rotation about an axis in a generally longitudinal direction, with respect to a longitudinal direction of the vehicle. The upper control arm 22 is also pivotally connected to the hub assembly 18 at a ball joint 28. The ball joint 28 supports the upper control arm on the hub assembly 18 while permitting the upper control arm 22 to pivot about a longitudinal axis at the ball joint 28. The ball joint 28 also permits the hub assembly 18 to pivot about a longitudinal axis through the ball joint 28 and pivot about a vertical axis (z) as the wheel 12 is rotated relative to the chassis 14 for steering of the wheel 12.

The upper control arm 22, illustrated in FIG. 1, includes a spring and damper system for absorbing and damping vibrations, noise and the like in minimizing the effects of these conditions upon the chassis 14. Additionally, the shock and vibration absorption and damping system of the upper control arm 22 facilitates stability of the vehicle by prolonged engagement of the tire 16 to the underlying road surface. Further, comfort is enhanced by the spring and damping features. Accordingly, the upper control arm 22 is illustrated with a spring and damper housing 30, which includes a static portion of the spring and damper system fastened to the chassis upper control arm support 26 with a dynamic portion that pivots relative to the chassis upper control arm support 26.

The spring and damper housing 30 may contain a variable spring and damper system such as the one disclosed in European Patent Application No. 1 354 731 A1, which published on Oct. 22, 2003 to Zetterström, which is incorporated in its entirety by reference herein. Of course, the invention contemplates that the suspension assembly 10 may include a spring and damper system such as that disclosed in the Zetterström U.S. Pat. No. 6,386,553 B2 patent, a conventional strut system, or the like.

The upper control arm 22 may include a stamped bracket 32, which is pivotally connected to the ball joint 28 and fastened to the spring and damper housing 30 through rubber bushings 34. The rubber bushings 34 mount the bracket 32 to the dynamic or pivotal portion of the spring and damper housing 30 so that the bracket 32, rubber bushings 34 and dynamic portion of the spring and damper housing 30 pivot relative to the chassis upper control arm support 26. The rubber bushings 34 further facilitate damping from loads imparted to the upper control arm 22. The rubber bushings 34 also reduce noise imparted from the hub assembly 18 to the chassis 14.

As the vehicle translates along a road surface, vertical forces are imparted to the wheel 12 and consequently to the hub 18 are imparted to the upper control arm 22. Thus, the upper control arm 22 is designed to handle such vertical forces. As the wheel 12 is driven, or braked, these accelerations and decelerations apply a torque to the hub assembly 18, which is imparted to the upper control arm 22. The upper control arm 22 is designed to handle such torques.

The chassis 14 includes a generally vertical portion 36 that extends from the chassis upper control arm support 26 to a laterally inboard extending horizontal portion 38. The chassis vertical portion 36 spaces the chassis upper control arm support 26 from the chassis horizontal portion 38. The lower control arm 24 is pivotally connected to the chassis 14 at lower control arm support 40, which is spaced below the upper control arm 22. Although the upper control arm 22 and lower control arm 24 are illustrated in vertically spaced opposition and are described with different features, the invention contemplates that the features of the upper control arm 22 may be utilized at a lower orientation and the features of the lower control arm 24 may be utilized at an upper orientation. The terms upper and lower are employed with reference to spatial relationships and orientations of the suspension assembly 10 illustrated in FIG. 1, and are utilized for purposes of description, not limitation.

With reference now to FIGS. 1 through 4, the lower control arm 24 is illustrated in cooperation with the hub assembly 18 and chassis 14 in FIG. 1 and is illustrated disassembled from the hub assembly 18 and the chassis 14 in FIGS. 2 to 4. The lower control arm 24 may include a pair of linear actuators. The linear actuators are spaced about a vertical plane which includes a central axis of the wheel 12. Accordingly, for purposes of description, the actuators are referred to herein as a front actuator 42 and a rear actuator 44 as described in relation to the front and rear of the vehicle.

The actuators 42, 44 each have a first end 46 pivotally connected to the chassis lower control arm support 40. The actuator first ends 46 may be pivotally connected to the chassis lower control arm support 40 through an elastomeric bushing for providing compliancy and damping the connection. The actuators 42, 44 each include a shaft 48, which extends or retracts from a housing 50 of the actuator 42, 44. The actuator shafts 48 are each fastened to the hub assembly 18 through a pivotal joint 50. The pivotal joints 50 permit the hub assembly 18 to pivot about a longitudinal axis and a vertical axis. The pivotal joints 50 may be provided by ball joints.

The actuators 42, 44 may be linear actuators, such as linear motors, which are driven electrically, electrically with servo control, hydraulically, pneumatically or the like. Feedback may be utilized for positioning of the shafts 48.

The actuators 42, 44 may be utilized collectively for controlling steering of the wheel 12, adjusting camber of the wheel 12, and adjusting alignment of the wheel 12. Further, an additional actuator may be provided within the upper control arm 22 for adjusting caster of the wheel 12.

The actuators 42, 44 illustrated in FIGS. 1 through 4 may be electrically driven, and controlled via software for integration of the hub assembly 18, spring and damper system within the housing 30, and the actuators 42, 44 for collective software control of the suspension assembly 10 and hub assembly 18. Of course, the invention contemplates various power sources and controls for the suspension assembly 10 in accordance with the present invention.

The Zetterström U.S. Pat. No. 6,386,553 B2 Patent and the Zetterström EP 1 354 731 A1 patent application both disclose suspension assemblies that utilize actuators for controlling steering, camber, and alignment of a vehicle wheel. Accordingly, these references have been incorporated by reference as indicated above.

Actuators, such as linear actuators, are capable of handling large loads in a direction in which the actuator translates. For example, the linear actuators 42, 44 are capable of withstanding large loading in a longitudinal direction of the actuator 42, 44. Thus, the linear actuators 42, 44 are capable of withstanding large loads in the direction of the shaft 48.

However, ordinary operating conditions of a suspension assembly, such as the suspension assembly 10, impart various loads to a lower control arm such as the lower control arm 24. Such forces include vertical forces imparted upon the wheel 12 and hub assembly 18 as when the tire 16 engages irregularities on a road surface. Other loads include a driving torque imparted upon the lower control arm 24 as a resultant torque to the driving torque imparted upon the wheel 12. Further, a braking torque is applied to the control arm 24 as a resultant torque to that applied for decelerating the wheel 12. These vertical loads and torques impart loading to the linear actuators 42, 44 in directions that are not co-linear with the shaft 48. In other words, these conditions present loads that have both longitudinal and transverse values. An aspect of the prior art to overcome such transverse loading utilized linear actuators that were sufficient in transverse load capacity to withstand the vertical loads and torques imparted upon the lower control arm.

In order to reduce transverse loads applied to the linear actuators 42, 44 of the control arm 24, a linkage 52 is provided in the lower control arm 24 for distributing the vertical loads and torques applied to the lower control arm 24 to the chassis 14 to minimize such loads imparted upon the linear actuators 42, 44. By employing the linkage 52 in the lower control arm 24, the linear actuators 42, 44 may be sized for appropriate linear forces applied longitudinally thereto, thus minimizing the space required for each actuator and thereby maximizing the life of the linear actuators 42, 44.

The linkage 52 is evenly spaced between the linear actuators 42, 44 and is aligned with a central axis (x) of the hub assembly 18 for providing a symmetrical lower control arm 24 so that even side forces or linear loads are applied to each of the linear actuators 42, 44.

The linkage 52 includes a pivot link 54 pivotally connected to the chassis lower control arm support 40 at a first end 56 of the pivot link 54. The pivot link first end 56 may include a bushing for damping shock, vibration and noise imparted to the chassis 14. The first end 56 of the pivot link has a width sized to engage the chassis lower control arm support 40.

Additionally, the pivot link 54 receives a leaf spring 58, which extends from chassis horizontal portion 38. The leaf spring 58 may extend laterally across the vehicle for installation and operation with a pair of opposed lower control arms 24 of a pair of opposed suspension assemblies 10. The leaf spring 58 rests upon the pivot link 54 and is supported solely by the pair of opposed lower control arms 24. The leaf spring 58 is curved along its length with distal ends pointing downward in an unloaded condition. Accordingly, the leaf spring 58 biases the pivot link 54 downwards. Consequently, the downward bias of the leaf spring 58 on the lower control arm 24 creates a lifting force to the chassis 14 and the vehicle for suspending the vehicle and supporting a static vehicle weight. The invention contemplates utilization of other spring designs, such as coil springs, for supporting the static weight of the vehicle.

The pivot link 54 is provided with an upper elastomeric cushion 60 oriented above the leaf spring 58 and a lower elastomeric cushion 61 disposed beneath the leaf spring 58. The upper and lower cushions 60, 61 retain the leaf spring 58 against the pivot link 54 and dampen shocks and vibrations provided therebetween. No other mechanical fasteners are required for the leaf spring 58 and the chassis 14 because the chassis 14 rests upon the leaf spring 58 and the leaf spring 58 is retained by the cushions 60, 61 of the pair of opposed control arms 24.

The linkage 52 is also pivotally connected to the hub assembly 18. The linkage 52 is translatable to accommodate translations imparted by the linear actuators 42, 44. Accordingly, the linkage 52 may be provided with a four-bar mechanism 62 for providing such translation. With reference now to FIGS. 5 and 6, the linkage 52 is illustrated enlarged and detached from the hub assembly 18 and chassis 14 for discussion of its components. The pivot link 54 has a second end 64 with a pair of pivotal connections for providing a link within the four-bar mechanism 62. A pair of intermediate links 66, 68 are each pivotally connected to the pivot link second end 64. A translatable link 70 is provided, which is pivotally connected to the intermediate links 66, 68 for translation of the translatable link 70 relative to the pivot link 54. Bushings may be provided at each pivotal connection within the four-bar mechanism 62 for damping of shock and vibrations through the linkage 52.

Referring again to FIGS. 2 through 4, the four-bar mechanism 62 has a width that is sized to be disposed between the linear actuators 42, 44 to avoid interference with the actuators

42, 44. With reference to FIG. 4, the intermediate links 66, 68 have a tapered profile to adapt to the differing widths of the pivot link 54 and the translatable link 70.

The translatable link 70 has an outboard end 72 for cooperating with the hub assembly 18. Specifically, a pivotal joint 74 is provided at the translatable link outboard end 72 for attaching the translatable link 70 to the hub assembly 18 generally aligned vertically with the ball joint 28 yet spaced apart vertically from the ball joint 28. The pivotal joint 74 permits rotation about a longitudinal axis with respect to a longitudinal direction of the vehicle and rotation about a vertical axis that is generally co-linear with a vertical axis of the ball joint 28. Thus, the hub assembly 18 is rotated about vertical axis for alignment and steering by pivoting about the ball joint 28 in the pivotal joint 74.

Referring again to FIGS. 5 and 6, an overall dimension of the linkage 52 measured from the pivotal connection with the chassis 14 and the pivotal connection with the hub assembly 18 is variable for accommodating the translation of the hub assembly 18 as controlled by the actuators 42, 44. This dimension is illustrated in FIG. 5 at an extended orientation of the linkage 52 and referenced by dimension $d_e$. This dimension of the linkage 52 is also illustrated in FIG. 6 in a retracted orientation of the linkage 52 and is referenced by dimension $d_r$. Thus, as the actuators 42, 44 translate a lower region of the hub assembly 18 away from the chassis 14, such as during a large inboard camber angle, the linkage 52 may extend to an extended orientation $d_e$ as illustrated in FIG. 5. As the wheel 18 is driven upward vertically, such as engagement of irregularity in a road surface that causes a jounce, the hub assembly 18 may translate upward vertically, and due to pivotal cooperation with the upper control arm 22 and lower control arm 24, the hub assembly may also translate inboard toward the chassis 18. In order to accommodate such translation of the hub assembly 18, the linkage 52 may retract to a dimension of $d_r$ as illustrated in FIG. 6.

A controller for the actuators 42, 44, such as a vehicle microprocessor, can calculate optimum camber angles for each wheel 12. Such calculation may be performed continuously so any length of the actuators 42, 44 can be performed at any vertical position of the wheel 12. Thus, the linkage 52 may extend and retract as a function of camber defined by the actuators 42, 44, as the wheel 12 may move upward or downward to jounce or rebound positions.

The linkage 52 does not substantially resist side forces. Accordingly, the linear actuators 42, 44 control the side forces by translating the hub assembly 18 or resisting translation of the hub assembly 18. The linkage 52 however does resist vertical upward forces which may be applied to the hub assembly 18, which are imparted through the linkage 52 to the leaf spring 58. Additionally, the linkage 52, being offset from the central axis (x) of the hub assembly 18, resists driving and braking torques applied from the hub assembly 18 to the lower control arm 24. Such torques result in a moment applied to the linkage 52 because the linkage 52 is offset radially from the central axis (x) of the hub assembly 18.

With reference now to FIG. 1, the suspension assembly 10 is illustrated with a pair of brackets 76, 78 extending outboard from the chassis vertical portion 36. A jounce stop 80 is mounted to the bracket 76 for limiting upward movement of the wheel 12. Specifically, the jounce stop 80 is an elastomeric cushion formed of polyurethane, rubber or similar material for engaging the translatable link 70 of the linkage 52 of the lower control arm 24 in a maximum vertical upward movement or jounce of the hub assembly 18.

Likewise, a rebound stop 82, formed of like material, is provided on the bracket 78. Rebound refers to downward vertical translation of the wheel 12. The rebound stop 82 is aligned to engage the upper control arm 22 as the wheel 12 extends vertically downward.

With continued reference to FIG. 1, a vertical axis is illustrated and referenced by z. This vertical axis (z) represents the axis about which the hub assembly 18 pivots as driven by the linear actuators 42, 44. By extension of one actuator and retraction of the other actuator, the wheel 12 may be rotated above the vertical axis z for steering of the wheel 12. Additionally, alignment of the wheels 12 may be performed by adjustment by the actuators 42, 44. Such alignment is often referred to as toe-in. Additionally, the camber of the wheel, which is the angle of the wheel 12 relative to vertical and as illustrated by angle θ in FIG. 1. The camber θ may be adjusted by extension of both actuators 42, 44 or retraction 42, 44.

With reference now to FIG. 7, the suspension assembly 10 is illustrated from a top plan view with the chassis 14 and upper control arm 22 removed for a clear view of the cooperation of the lower control arm 24 and the hub assembly 18 during a steering operation. Specifically, the actuators 42, 44 are illustrated controlling steering by varying a steering angle Φ, which is illustrated as a wheel offset of ten degrees. Such control is provided by extension of the front actuator 42 and retraction of the rear actuator 44. Thus, steering as well as the alignment of the wheel 12 may be controlled by the actuators 42, 44. Alignment may be provided with an angular positional sensor or feedback information from the actuators 42, 44 which may measure side forces which are imparted longitudinal with respect to the actuators 42, 44 during a straight driving operation.

With reference now to FIG. 8, the rear view of the suspension assembly 10 is provided without the chassis 14. The wheel 12 is illustrated in a rebound position representative of the wheel 12 extending vertically downward. The actuators 42, 44 are illustrated providing a large camber angle θ for adjusting the wheel 12 relative to a road surface condition or an angular orientation of the chassis relative to the road surface.

Figure 9:
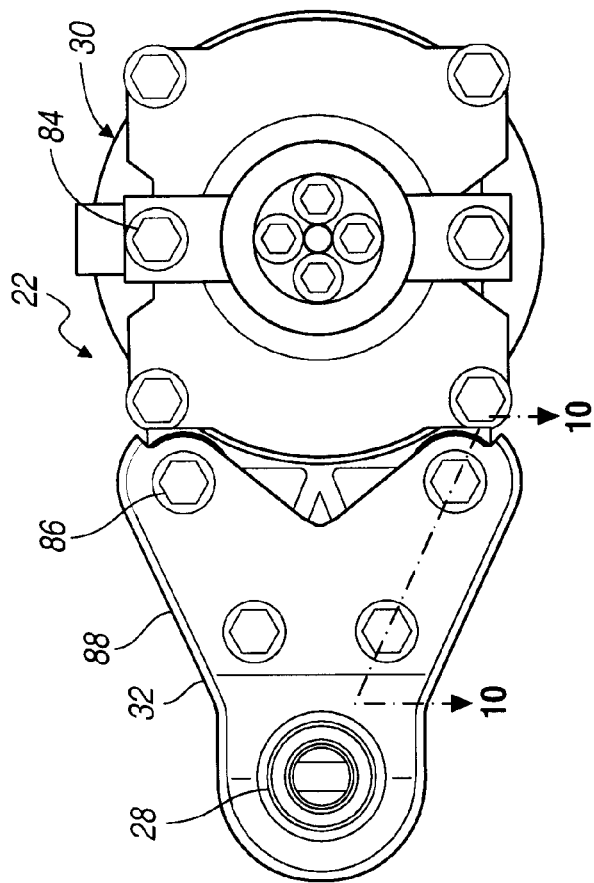
FIG. 9 is an enlarged rear side elevation view of another control arm of the suspension assembly of FIG. 1.
Figure 10:
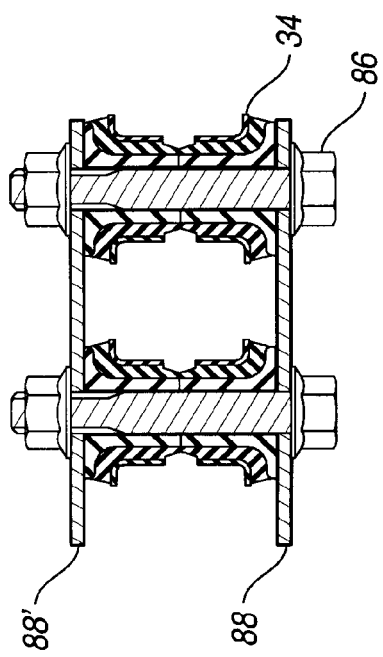
FIG. 10 is a section view taken across section line 10-10 in FIG. 9.

Referring now to FIG. 9, the upper control arm 22 is illustrated enlarged for greater detail. The spring and damper housing 30 includes a mounting pattern 84 for bolting the static portion of the spring and damper housing 30 to the chassis upper control arm support 26. The stamped bracket 32 is illustrated mounted to the spring and damper housing 30 by four rubber bushings 34. The rubber bushings 34 are illustrated in cross-section in FIG. 10. Each rubber bushing 34 is mounted about a bolt 86 that extends between a pair of plates 88, 88' that collectively form the bracket 34. The rubber bushings 34 dampen vertical and longitudinal forces that are imparted from the hub assembly 18 to the spring and damper housing 30.

In summary, suspension assemblies are disclosed such as the suspension assembly 10, which utilizes a linkage in cooperation with an actuated control arm for reduction of adverse loads applied to the actuator while permitting the actuator to provide various control functions. For the embodiment illustrated, the driving of the wheel 12, the braking of the wheel 12, the actuation of the wheel 12, and the spring and damping of the wheel 12, may all be controlled and powered electronically for an integrated electronic control of the suspension assembly 10 and powertrain associated therewith. Thus, a drive by wire operation of a vehicle may be provided which integrates acceleration, deceleration, stability, comfort and the like.

While embodiments for carrying out the invention have been described in detail, those familiar with the art to which this invention relates will recognize various alternative designs and embodiments for practicing the invention as defined by the following claims.

What is claimed:

1. A suspension assembly for a vehicle wheel comprising:
   a hub assembly supporting a wheel for rotation;
   a first control arm pivotally connected to the hub assembly and a chassis of a vehicle;
   at least one actuator connected to the chassis and the hub assembly for translation of the hub assembly relative to the chassis; and
   a linkage connected to the chassis proximate to a connection of the at least one actuator, the linkage being connected to the hub assembly proximate to the connection of the at least one actuator for reducing transverse loads and torques applied to the at least one actuator from the hub assembly;
   wherein the linkage further comprises a four-bar mechanism.

2. The suspension assembly of claim 1 wherein the at least one actuator further comprises at least one linear actuator.

3. The suspension assembly of claim 1 wherein the linkage cooperates with a leaf spring of the chassis for supporting a static weight of the vehicle.

4. The suspension assembly of claim 1 wherein the linkage retracts during upward and downward movement of the hub assembly.

5. The suspension assembly of claim 1 wherein the linkage extends during upward and downward movement of the hub assembly.

6. The suspension assembly of claim 1 wherein the first control arm is further defined as an upper control arm and the upper control arm is spaced vertically above the at least one actuator and the linkage.

7. The suspension assembly of claim 1 wherein the first control arm further comprises a spring and a damper for absorbing and damping vibrations from the hub assembly.

8. The suspension assembly of claim 1 wherein the at least one actuator and the linkage further define a lower control arm spaced vertically below the first control arm.

9. The suspension assembly of claim 1 wherein the at least one actuator controls steering, camber and alignment of the wheel by translating the hub assembly relative to the chassis.

10. The suspension assembly of claim 1 wherein the at least one actuator further comprises a pair of actuators.

11. The suspension assembly of claim 10 wherein the pair of actuators are spaced apart and the linkage is oriented therebetween.

12. A motor vehicle suspension having at least four independent wheel suspension assemblies, each independent wheel suspension assembly comprising the suspension assembly according to claim 1.

13. A suspension assembly for a vehicle wheel comprising:
    a hub assembly supporting a wheel for rotation;
    a first control arm pivotally connected to the hub assembly and a chassis of a vehicle;
    at least one actuator connected to the chassis and the hub assembly for translation of the hub assembly relative to the chassis; and
    a linkage connected to the chassis proximate to a connection of the at least one actuator, the linkage being connected to the hub assembly proximate to the connection of the at least one actuator for reducing transverse loads and torques applied to the at least one actuator from the hub assembly;
    wherein the linkage further comprises a pivot link pivotally connected to the chassis and a translatable link operably connected to the pivot link for translation relative to the pivot link, and the translatable link being pivotally connected to the hub assembly; and
    wherein the linkage further comprises a pair of intermediate links each having a first end pivotally connected to the pivot link and a second end pivotally connected to the translatable link.

14. The suspension assembly of claim 13 wherein the translatable link retracts towards the pivot link during upward and downward movement of the hub assembly.

15. The suspension assembly of claim 13 wherein the translatable link extends from the pivot link during upward and downward movement of the hub assembly.

16. The suspension assembly of claim 13 wherein the pivot link cooperates with a leaf spring of the chassis for supporting a static weight of the vehicle.

17. The suspension assembly of claim 16 further comprising an elastomeric cushion mounted to the pivot link and engaging the leaf spring for damping vibrations from the pivot link to the chassis.

18. An independent suspension assembly for a vehicle wheel comprising:
    a hub assembly supporting a wheel for rotation relative to the hub assembly;
    an upper control arm pivotally connected to a chassis of a vehicle and connected to the hub assembly via a ball joint, the upper control arm having a spring and a damper for absorbing and damping vibrations from the hub assembly; and
    a lower control arm mechanism including;
        a pair of spaced apart linear actuators, each linear actuator being pivotally connected to the chassis and pivotally connected to the hub assembly for controlling steering, camber and alignment of the wheel,
        a pivot link pivotally connected to the chassis and extending between the pair of actuators, and
        a four-bar mechanism attached to the pivot link and pivotally connected to the hub assembly for extension and retraction of the four-bar mechanism relative to the chassis as the hub assembly is translated by the pair of linear actuators, wherein the four-bar mechanism distributes vertical forces and torques from the hub assembly to the chassis for minimizing vertical forces and torques applied to the pair of linear actuators.

19. The independent suspension assembly of claim 18 wherein the pivot link cooperates with a leaf spring of the chassis for supporting a static weight of the vehicle.

20. A suspension assembly for a vehicle wheel comprising:
    a hub assembly supporting a wheel for rotation;
    a first control arm pivotally connected to the hub assembly and a chassis of a vehicle;
    at least one actuator connected to the chassis and the hub assembly for translation Of the hub assembly relative to the chassis; and
    a linkage connected to the chassis proximate to a connection of the at least one actuator, the linkage being connected to the hub assembly proximate to the connection of the at least one actuator for reducing transverse loads and torques applied to the at least one actuator from the hub assembly;
    wherein the linkage cooperates with a leaf spring of the chassis for supporting a static weight of the vehicle.

* * * * *